(No Model.)

C. SELDEN.
STATIC NEUTRALIZER FOR TELEGRAPHS.

No. 291,097. Patented Jan. 1, 1884.

WITNESSES
Ernest Abshagen
Albert F. Leonhard

INVENTOR
C. Selden
By his Attorney
H. C. Townsend

United States Patent Office.

CHARLES SELDEN, OF ST. LOUIS, MISSOURI.

STATIC NEUTRALIZER FOR TELEGRAPHS.

SPECIFICATION forming part of Letters Patent No. 291,097, dated January 1, 1884.

Application filed February 7, 1883. (No model.)

*To all whom it may concern:*

Be it known that I, CHARLES SELDEN, a citizen of the United States, and a resident of St. Louis, in the State of Missouri, have invented a certain new and useful Static Neutralizer for Telegraphs, of which the following is a specification.

The object of my invention is to neutralize the disturbing effects of the static discharge-current from telegraph-lines upon the receiving-instruments.

My invention consists in a novel combination of a local battery, a local-circuit condenser, a switch, and an auxiliary coil of wire, the magnetic effects of which, when a current from the condenser circulates therein, are made to act in opposition, by any suitable means, to the effects of the static discharge-current from the line circulating in the coils of the receiver.

The method of combining and the principle of operation of the above devices are as follows: At some portion of each complete movement of the transmitter, in putting the main battery to line and withdrawing it from line, the local battery is connected to the condenser, the connection of the auxiliary coils with the condenser and battery being at such time broken. Simultaneously, however, with the withdrawal of the main-line battery and the connection of the line to earth the condenser is connected to the auxiliary local coils in a local circuit, so as to discharge through said coils, the connection of said condenser with said local battery being broken simultaneously with or immediately previous to the connection of said condenser with the auxiliary coils.

The operation of making and breaking the local connections of the local battery, condenser, and auxiliary coils is effected automatically by any suitable devices working simultaneously with the movements of the transmitter.

Figure 1:
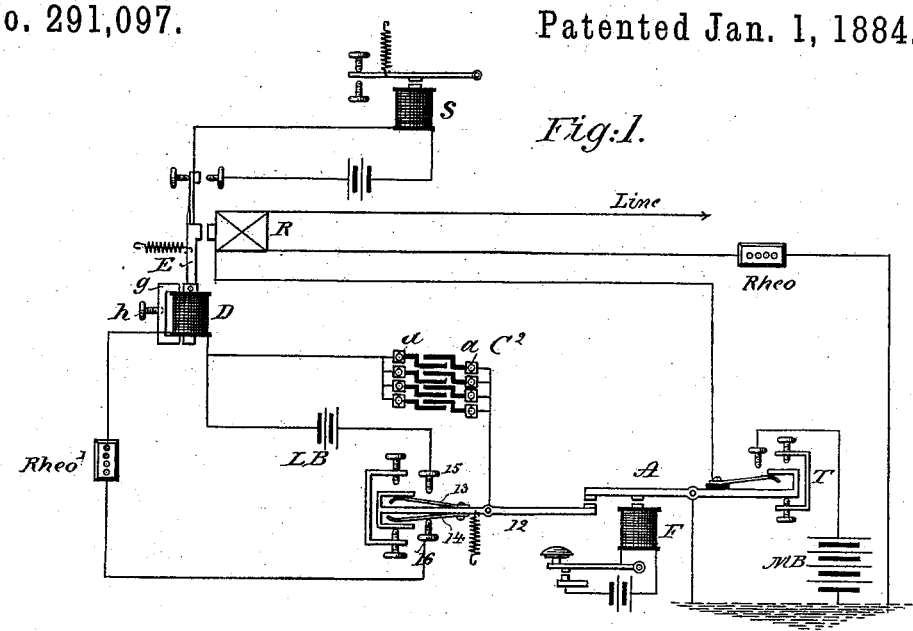
Figure 2:
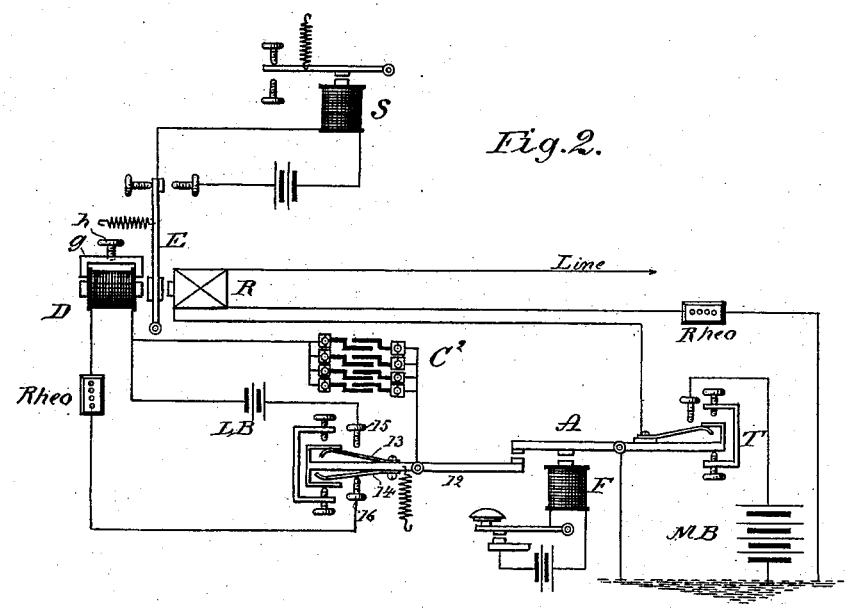

In the accompanying drawings, Figure 1 is a diagram illustrating one construction and arrangement of devices that may be employed for carrying out my invention. Fig. 2 illustrates another arrangement of devices, in which a modified plan for causing the local current from the condenser circulating in the auxiliary coils to counteract the effects of the static discharge-current in the relay is employed.

The diagram shows the application of the invention to a well-known form of duplex telegraph; but its method of application to other forms of telegraph—whether duplex, multiplex, or single—will be obvious from the following description of its application to a duplex, and is substantially the same in all cases.

In Fig. 1, R indicates an ordinary differentially-wound relay, one of whose coils is in the main-line circuit, while its other coil is in an artificial circuit to earth, through a rheostat, Rheo.

A indicates the lever of a transmitter, of the ordinary or any suitable construction, the insulated contact-spring of which is connected, as usual, to the relay, while the contact-stop for said spring is connected to the main-line battery M B. The hook on the end of the lever, against which the spring normally rests, is connected to earth, as usual.

The ordinary stops for the transmitter are indicated at T, while F indicates the electro-magnet which operates the transmitter, and which is controlled by a local battery and key, in the ordinary manner.

S indicates the sounder, the local circuit of which is controlled by relay R, and E indicates the armature of said relay, consisting, in the present instance, of a pivoted bar of iron, either mounted on the core of the auxiliary coils D or itself constituting the core of said coils, or arranged in any other way, so that the current in said coils may tend to give to said armature a polarity the opposite of that which is induced in it by the action of the relay when a static discharge-current circulates in the relay-coils, and to thus render the armature incapable of being attracted so as to close the local circuit. This arrangement of a neutralizing-coil on the relay-armature is described in another application for patent filed by me, and no specific claim is herein made to it. The coils D are connected on one side to a condenser, $C^2$, and on the other to a contact, 16, through which the coils are at the proper time connected with the other pole of the condenser.

L B indicate the local charging-battery for the condenser, one pole of which battery is connected to the condenser, while its other is connected with a contact, 15, through which connection is made with the other pole of the condenser when the latter is to be charged.

A lever, 12, carries contact-springs 14 13 for making the proper connections between the condenser and the battery and coil D, and is operated by the transmitter-lever A, which engages with the same every time the main-line battery is put to line. Lever 12 is provided with the usual retractor and adjustable stops, as indicated.

The condenser C² consists of any suitable number of pairs of plates, all or a portion only of which may be connected into circuit by the plug-switches a a, according to the strength of the static discharge-current in the main line and the consequent strength of neutralizing effects desired in auxiliary coils D. A rheostat, Rheo′, may be used for the same purpose.

To adjust the duration of the local neutralizing effects to the duration of the static discharge-current, I provide a means for varying the rapidity of the magnetic discharge of the core of D after being charged by the condenser. Such a device is indicated at g, and consists of an armature adapted to magnetically connect the poles of the core to a greater or less extent, according to its proximity thereto, and an adjusting-screw, h, for adjusting said armature. The time of discharge of said core increases, as is well known, with the approach of the armature.

The operation of the above devices is as follows: When the parts are at rest and in the position shown, no current flows in coils D, the condenser having been discharged, and the armature of the relay is therefore free to respond to signaling-currents from the distant station in the ordinary way. When the transmitter puts the main battery to line, the condenser is simultaneously connected to the local battery L B, and is charged thereby, the connection of the coils with the condenser and battery being at the same time broken at 14 16. The coils D, therefore, are still without current, and the armature E is unaffected thereby, and is free to respond to any incoming current. As the transmitter returns to its normal position, and simultaneously with the connection of the main line to earth through the spring and hook, the condenser is connected to the coils D through 14 16, the circuit for the battery being first broken, however, by the disconnection of 13 15, and the discharge-current from said condenser therefore circulates through the coils D and renders the relay-armature insensible to the effects of the static discharge-current in the relay-coils. The connection of the coils D necessary to give a neutralizing effect can be determined from a consideration of the polarities of the battery, condenser, &c., or can be ascertained experimentally.

I do not limit myself to any particular kind of circuit closing and breaking devices for effecting the proper connections and disconnections of the auxiliary coil, local battery, and condenser, nor to any particular method of operating said devices simultaneously with the movements of the transmitter, as it is obvious that many devices might be adapted or invented for this purpose without departing from the invention or the general principle of operation hereinbefore set out. The circuit closer and breaker, which may, for convenience, be termed a "circuit-controller" or "switch," may be operated directly or indirectly by the transmitter, or by any portion of the apparatus moving simultaneously with said transmitter, or by any device constructed to move simultaneously therewith, the only essential being that the switch shall act to connect the battery to the condenser, at the same time disconnecting the coils, and then to connect the condenser (after being charged by the local battery) to the auxiliary coil simultaneously with the formation of the direct circuit between the line and earth. The auxiliary coils may be made to oppose the effects of the static discharge working in the coils of the relay by any suitable arrangement of said coils, so that they will act mechanically, magnetically, or inductively.

One other method of using the auxiliary coil is shown in Fig. 2, and illustrates an application of the same, in which their effects are mechanically, instead of inductively, opposed to the effects of the relay when acted upon by the static discharge-current. In this figure the core of coils D is arranged to exert a pull upon the armature-lever E of the relay in mechanical opposition to the core of the relay. In this case the armature-lever is constructed, in the ordinary way, of a piece of brass or other non-magnetic material, carrying the armature proper. The core of coils D acts upon said armature on the opposite side from the relay, or an independent armature may be provided for D. The method of operation is substantially the same as with the devices of Fig. 1, the difference being that in the one case the coil D neutralizes the effect of the static discharge in the relay-coils by magnetic induction upon the armature, while in the other case the opposition is mechanical.

What I claim as my invention is—

1. The combination, with a relay, a local battery, a condenser, a local auxiliary neutralizing-coil normally out of circuit with said condenser, and a circuit-controller for switching the auxiliary coils into a discharge-circuit with the condenser simultaneously with the flow of the static discharge-current in the relay.

2. The combination, substantially as described, of a relay, an auxiliary local neutralizing-coil for neutralizing in the relay the effects of the static discharge-current, a local battery, a condenser in the local circuit, a circuit-controller for connecting a pole of the condenser alternately to the local battery and the auxiliary coils, and means for operating said controller, so as to allow the condenser to discharge through the auxiliary coils simultaneously with the withdrawal of the main-line battery and the connection of said line to earth.

3. The combination of a relay-armature, an auxiliary coil acting on said armature in opposition to the relay-coils when affected by static discharge-current, a local battery and condenser, and means for connecting a pole of the condenser alternately with the local battery and the auxiliary coil, the connection with the latter being effected simultaneously with the flow of the static discharge-current in the relay.

4. The combination of a relay, a local auxiliary coil acting inductively on said relay in opposition to the relay-coils when traversed by the static discharge-current, a local battery and condenser, and means for connecting a pole of the condenser alternately, first to the battery and then to the auxiliary coils, simultaneously with the flow of the static discharge-current in the relay-coil.

5. The combination of a relay, an auxiliary coil acting in opposition to the relay-coils when affected by the static discharge, a local battery and condenser, and a supplemental circuit-closer operated by the transmitter and connecting a pole of the condenser alternately to the battery and the auxiliary coils.

Signed at St. Louis, in the State of Missouri, this 18th day of January, A. D. 1883.

CHARLES SELDEN.

Witnesses:
H. C. TOWNSEND,
THOS. TOOMEY.